United States Patent
Faroudja et al.

(10) Patent No.: US 8,929,446 B1
(45) Date of Patent: Jan. 6, 2015

(54) COMBINER PROCESSING SYSTEM AND METHOD FOR SUPPORT LAYER PROCESSING IN A BIT-RATE REDUCTION SYSTEM

(71) Applicant: Faroudja Enterprises Inc., Los Altos, CA (US)

(72) Inventors: Yves Faroudja, Los Altos Hills, CA (US); Ka Lun Choi, Los Altos, CA (US); Xu Dong, San Jose, CA (US)

(73) Assignee: Faroudja Enterprises, Inc., Los Altos, CA (US)

( * ) Notice: Subject to any disclaimer, the term of this patent is extended or adjusted under 35 U.S.C. 154(b) by 0 days.

(21) Appl. No.: 14/211,932

(22) Filed: Mar. 14, 2014

(51) Int. Cl.
| H04N 7/12 | (2006.01) |
| H04N 11/02 | (2006.01) |
| H04N 11/04 | (2006.01) |
| H04N 19/146 | (2014.01) |
| H04N 19/51 | (2014.01) |
| H04N 19/82 | (2014.01) |
| H04N 19/43 | (2014.01) |
| H04N 19/90 | (2014.01) |
| H04N 19/14 | (2014.01) |
| H04N 19/154 | (2014.01) |

(52) U.S. Cl.
CPC ... *H04N 19/00169* (2013.01); *H04N 19/00745* (2013.01); *H04N 19/00896* (2013.01); *H04N 19/00509* (2013.01); *H04N 19/00945* (2013.01); *H04N 19/00157* (2013.01); *H04N 19/002* (2013.01)
USPC .............................. 375/240.13; 375/240.29

(58) Field of Classification Search
None
See application file for complete search history.

(56) References Cited

U.S. PATENT DOCUMENTS 6,133,957 A 10/2000 Campbell
2014/0037223 A1 * 2/2014 Jiang et al. ............... 382/238

OTHER PUBLICATIONS

U.S. Appl. No. 14/212,482, filed Mar. 14, 2014, entitled, "Bidimensional Bit-Rate Reduction Processing".

* cited by examiner

*Primary Examiner* — Dave Czekaj
*Assistant Examiner* — Nam Pham
(74) *Attorney, Agent, or Firm* — Convergent Law Group LLP

(57) ABSTRACT

A combiner processing system and a method of operating the combiner processing system are disclosed. In one embodiment, the combiner processing system is utilized for a support layer processing in a bit-rate reduction system that separates video data into a main layer and a support layer with separated encodings for the two layers for bit-rate reduction and data transmission efficiency. Preferably, the combiner processing system for the support layer processing is capable of processing repeat patterns, small high frequency details, and textual information contained in one or more images. Furthermore, in one embodiment, the combiner processing system for the support layer processing provides a motion vector detection on a full image reconstruction, a non-linear quantization which retains both textual information and small high frequency details, utilization of full combination motion vectors, and a separate processing path for textual information with an internal bit-rate reduction unit.

17 Claims, 6 Drawing Sheets

101

A Combiner Processing System for Support Layer Processing

100

A Pre-Processor System Block Diagram

200

A Macro Block View of the Combiner Processing System for Support Layer Processing A Combiner Processing System for Support Layer Processing

400

Signal Amplitude vs. Quantization Levels in a Non-linear Quantization Model which Favors a Small Amplitude Signal Inter/Intra Selection and Motion Vector Detection Unit

600

A Bit Rate Reduction Unit

COMBINER PROCESSING SYSTEM AND METHOD FOR SUPPORT LAYER PROCESSING IN A BIT-RATE REDUCTION SYSTEM

INCORPORATION BY REFERENCE

This application is related to U.S. patent application Ser. No. 14/212,482, titled "BIDIMENSIONAL BIT-RATE REDUCTION PROCESSING" and filed on a date even herewith, and is incorporated herein by reference.

BACKGROUND OF THE INVENTION

Video data and signals generally require a high amount of bandwidth for communication over a wired and/or wireless data network, or over a direct peer-to-peer connection. Furthermore, increasingly ubiquitous utilizations of high-definition video codec standards for television broadcasts, Internet video broadcasts, Internet video telephony, and other multimedia-related applications are consuming and requiring high bit transfer rates (i.e. large bandwidths) over the wired and/or wireless data network for reliable transmission and display of the video data in real time.

In case of Internet-related video broadcasts and applications, image quality degradations, real-time video playback interruptions, and/or other quality-of-service limitations are common due to the large bandwidth requirements in transferring the video data over the Internet. This is especially true for transmission of high-definition videos. Furthermore, some television and other multimedia broadcasters are no longer satisfied with standard digital television standards, or even with the high-definition television (HDTV) standards (e.g. 1080i and 720p), because they prefer to move to higher scan rates (e.g. "4K," which is approximately 3840×2160 pixels), or higher frame rates (e.g. 120 Hz).

Although various video compression standards are attempting to alleviate the high bit-rate requirements of video transmissions by packing an increased data load into increasingly-overworked channels more efficiently, these improvements are still merely gradual and are limited to some newer compression standards.

Therefore, it may be desirable to provide a bit-rate reduction system that can be utilized for a plurality of existing video compression standards with a high bit rate reduction efficiency, while retaining a high image quality. It may also be desirable to separate original video data into a main layer processing and a support layer processing within the bit-rate reduction system, so that main layer data and support layer data can be separately processed for a high bit rate reduction efficiency prior to transmission, while retaining a high image quality upon decoding and combination of the separated video data at a receiving device.

Furthermore, conventional video compression systems tend to focus on mathematical comparisons of video inputs and video outputs before and after compression, rather than focusing on the visible quality of the video data in bit-rate reduction attempts. Consequently, conventional video compression systems are not typically optimized for retaining visible video quality of the video data relative to bit-rate reductions. Therefore, it may also be desirable to provide a novel combiner processing system and a related method of operation for support layer processing prior to transmission, wherein decisions to reduce bit rates in the video data are based on reducing information in the video data that can be recovered or improved through a video post-processing module in the decoder side to retain a good visible video quality for the end-viewer. The novel combiner processing system that optimizes bit-rate reductions based on retention of the human perception of the visible quality of the video data, instead of mere mathematical input-output comparisons of the video data, may be highly desirable.

In addition, it may also be desirable to provide a bit-rate reduction unit that makes bit-rate reduction decisions based on retention of the human perception of the visible quality of the video data. It may also be desirable to provide this bit-rate reduction unit to be utilized inside the combiner processing system for support layer processing, or with any encoder loop systems.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a novel combiner processing system and a related method of operation for support layer processing prior to transmission are disclosed. In this embodiment, the novel combiner processing system and the related method of operation contribute to the high bit rate reduction efficiency as well as the retention of high image quality by exhibiting specific novel characteristics, such as detection of repeat patterns, small high frequency details, a full image reconstruction by adding upconverted image into residual information, and computer-generated information such as texts contained in one or more images, which are enabled in part by a non-linear quantization module and a related method that are not properly utilized in conventional video processing loop systems.

Moreover, in another embodiment of the invention, a bit-rate reduction unit that can be utilized inside the combiner processing system for support layer processing, or with any encoder loop system, is disclosed. Preferably, the bit-rate reduction unit can detect edges, busyness, and computer-generated information such as texts for selective reduction and processing of large edges, high busyness areas, and/or other characteristics in video data, which accommodates reduced bit-rate transmission of the video data without any or substantial visible degradation of image and video quality.

Furthermore, in one embodiment of the invention, a combiner processing system for support layer processing of video data is disclosed. This system comprises: a bit-rate reduction unit, which detects textual information, edges, and busyness in one or more images in the video data, and selectively reduces or processes large edges and overly-busy busyness areas in the video data to generate a bit-rate reduced signal output, wherein the bit-rate reduction unit is executed on a memory unit and at least one of a programmable device and another hardware device; a non-linear quantization module that selectively outputs non-linearly quantized and bit-rate reduced signals prior to transmission, wherein the non-linearly quantized and bit-rate reduced signals retain textual and other large-signal level information as well as small high-frequency details and small-signal level information present in an original version of the video data; an inter or intra selection and motion vector detection unit that makes a decision for inter or intra mode selection and detects motion vectors based on full image information reconstructed from an addition of upconverted image signals to residual signals; and a loop filter unit that provides a filtered reconstructed residual signal to the inter or intra selection and motion vector detection unit.

Moreover, in another embodiment of the invention, a method for operating a combiner processing system for support layer processing is disclosed. This method comprises steps of: receiving an original video input (VOriginal), a video input signal for upconverted and reconstructed main layer (UBL), a motion vector input signal of a main layer from a main compressor (Umv), and a mode input from the main compressor (Umode) as input signals to the combiner processing system; detecting textual information, edges, and busyness in one or more images in video data based on the input signals in a bit-rate reduction unit executed on a memory unit and at least one of the programmable device and another hardware device; selectively reducing or processing large edges and overly-busy busyness areas in the video data to generate a bit-rate reduced signal output from the bit-rate reduction unit; selectively outputting non-linearly quantized and bit-rate reduced signals from a non-linear quantization module executed on the memory unit and at least one of the programmable device and another hardware device, wherein the non-linearly quantized and bit-rate reduced signals retain textual and other large-signal level information as well as small high-frequency details and small-signal level information present in an original version of the video data; determining an inter mode or intra mode selection and detecting motion vectors based on full image information reconstructed from an addition of upconverted image signals to residual signals in an inter or intra selection and motion vector detection unit, wherein the inter or intra selection and motion vector detection unit is executed on the memory unit and at least one of the programmable device and another hardware device; and filtering a reconstructed residual signal from the non-linear quantization module in a loop filter unit to generate a filtered reconstructed residual signal to the inter or intra selection and motion vector detection unit, wherein the loop filter unit is executed on the memory unit and at least one of the programmable device and another hardware device.

Additionally, in another embodiment of the invention, a bit-rate reduction system for a loop encoder in video data processing is disclosed. This bit-rate reduction system comprises: a text detection unit that detects textual information in one or more images in video data; an edge detection unit that receives upconverted video signals and detects edges in the one or more images in the video data; an edge processing unit that receives residual signal information associated with the video data and an edge detection decision from the edge detection unit to reduce or further process large edges from the video data; a busyness detection unit that receives the upconverted video signals and detects busyness areas in the video data; and a busyness processing unit that reduces or processes overly-busy busyness areas in the video data to generate a bit-rate reduced signal output for use in the loop encoder, wherein the text detection unit, the edge detection unit, the edge processing unit, and the busyness processing unit are executed on a memory unit and at least one of a programmable device and another hardware device.

DETAILED DESCRIPTION

Figure 1:
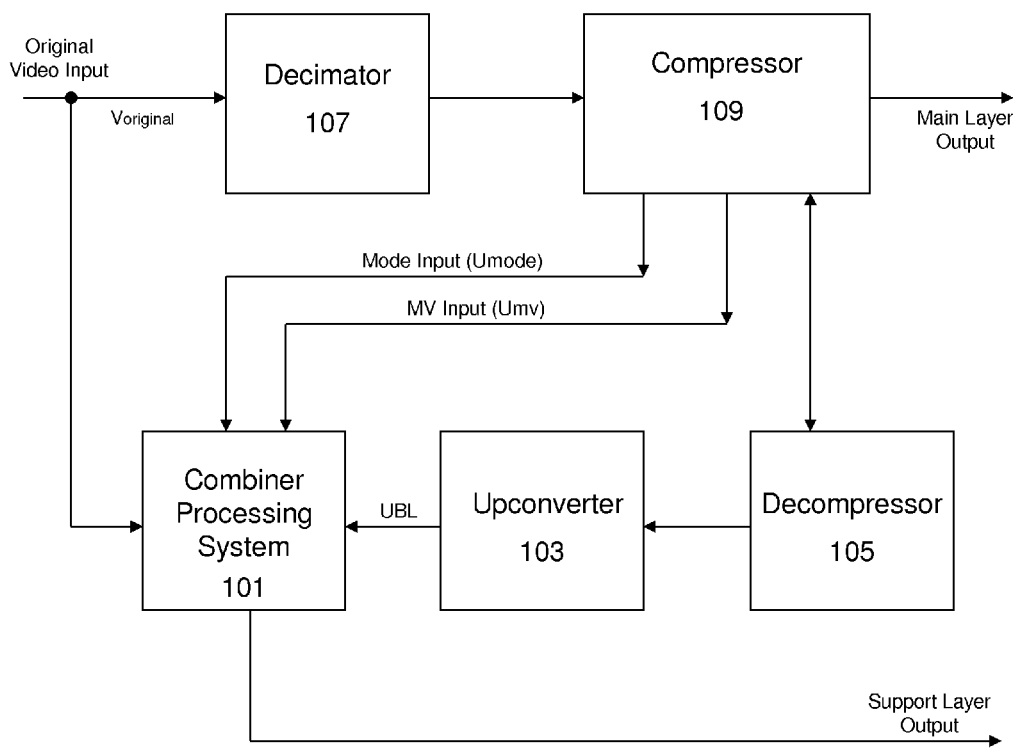
FIG. 1 shows a pre-processor system block diagram (100) for a bit-rate reduction system architecture with a main layer and a support layer prior to transmission of the video data to a receiving device, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble systems and methods for combiner processing systems utilized for support layer processing. Furthermore, the detailed description is also presented largely in terms of description of shapes, configurations, and/or other symbolic representations that directly or indirectly resemble a bit-rate reduction unit which may be utilized inside a combiner processing system, or in association with a video encoder loop. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flow-charts or diagrams representing one or more embodiments of the invention do not inherently indicate any particular order nor imply any limitations in the invention.

For the purpose of describing the invention, a term "main layer" is defined as a main pathway of separated video data, wherein the main pathway at a pre-processor stage includes a horizontal low-pass filter, a vertical low-pass filter, a horizontal pixel count reduction block, and a vertical pixel count reduction block to reduce bit-rates in a main portion of the video data. In a preferred embodiment of the invention, the main layer transmits low-frequency signals after the low-pass filtering, which contains a majority of video information without some potentially important details in repeat patterns, high-frequency signals, and/or computer-generated information such as texts in the video data. Some of these aspects of the invention associated with the main layer processing may be further described and/or claimed by related patent applications to this application.

In addition, for the purpose of describing the invention, a term "support layer" is defined as a supporting data pathway of the separated video data, wherein the supporting data pathway at a pre-processor stage and encoding includes a combiner processing system that incorporates capabilities to detect and process repeat patterns, small high frequency details, and computer-generated information such as texts contained in one or more images. Preferably, the combiner processing system for the support layer processing also provides a motion vector detection on a full image reconstruction by adding upconverted image into residual information, a non-linear quantization which retains both computer-generated information such as texts and small high frequency details, utilization of full combination motion vectors, and a separate processing path for computer-generated information such as texts with an internal bit-rate reduction unit. In a preferred embodiment of the invention, the support layer transmits high-frequency signal details while also providing additional bit-rate reductions, so that video signal details necessary for high-quality image and video reconstruction can be recovered and/or generated reliably at decoding and signal combination stages in a receiver device.

In one example, the combiner processing system for support layer processing may be implemented by a software program executed on a programmable device and/or another hardware device, such as a graphics processor unit (GPU), a field programmable gate array (FPGA), a central processing unit (CPU), and a memory unit of a computing device or another electronic device.

In another example, the combiner processing system for support layer processing may be at least partially hardwired and/or embedded codes operating in an application-specific integrated circuit (ASIC), or another semiconductor chip that loads the hardwired and/or embedded codes. ASIC's or other semiconductor chips that hardwire and/or embed the functionality of the combiner processing system may be utilized for televisions and other electronic devices.

In addition, for the purpose of describing the invention, a term "bit-rate reduction unit" is defined as a functional unit providing detection of edges, busyness, and computer-generated information such as texts for selective reduction and processing of large edges, high busyness areas, and/or other characteristics in video data to accommodate reduced bit-rate transmission of the video data without any or substantial visible degradation of image and video quality.

In one example, the bit-rate reduction unit may be implemented by a software program executed on a programmable device and/or another hardware device, such as a graphics processor unit (GPU), a field programmable gate array (FPGA), a central processing unit (CPU), and a memory unit of a computing device or another electronic device.

In another example, the bit-rate reduction unit may be at least partially hardwired and/or embedded codes operating in an application-specific integrated circuit (ASIC), or another semiconductor chip that loads the hardwired and/or embedded codes. ASIC's or other semiconductor chips that hardwire and/or embed the functionality of the bit-rate reduction unit may be utilized for televisions and other electronic devices.

Moreover, for the purpose of describing the invention, a term "edge detection" is defined as a process of searching, identifying, and/or counting a number of edges in video data by an edge detection unit for determining a need to reduce and/or process an edge or not for bit-rate reduction. If the edge is large and is determined by the edge detection unit to be reduced, and/or processed for bit-rate reduction, an edge processing unit reduces and/or processes the large edge for bit-rate reduction. Preferably, the edge detection unit and the edge processing unit are incorporated in a bit-rate reduction unit, which can be utilized inside a combiner processing system for support layer processing, or in association with a video encoder loop system.

Furthermore, for the purpose of describing the invention, a term "busyness" is defined as having many detailed and fine textures in a process area that includes a current pixel being analyzed and adjacent pixels near the current pixel. In general, the process area is a portion of still or moving image data for determining a need to reduce and/or process overly-busy area or not for bit-rate reduction. Preferably, a busyness detection unit and a busyness processing unit are located in a bit-rate reduction unit, which may be utilized in a combiner processing system for support layer processing, or in association with an encoder loop system. The busyness detection unit determines whether the process area is overly busy or not. If the process area is determined to be overly busy, then the busyness detection unit instructs the busyness processing unit to reduce and/or process the overly-busy area for bit-rate reduction. In a preferred embodiment of the invention, the busyness detection unit determines whether the process area is a "non-busy" area or an overly-busy area, based on a "busyness" measure relative to empirically-defined threshold values.

In addition, for the purpose of describing the invention, the following symbols are defined according to the following descriptions:

$V_{original}$: Original video input.

UBL: Upconverted and reconstructed video input from an upconverter.

MV: Motion vector, or motion vectors

UMV: Motion vector (MV) input from a main compressor.

Umode: Mode input from a main compressor.

RecR1: Reconstructed residual signal.

RecR2: Filtered reconstructed residual signal.

UBL+RecR: Intra or inter mode-selected signal (upconverted reconstructed main layer+reconstructed residual signal)

P2: Intra or inter mode-selected reconstructed residual signal

R: Residual signal output from an adder that calculates the difference between the original video input ($V_{original}$) and the intra/inter mode-selected addition of the upconverted reconstructed main layer and reconstructed residual signals (UBL+RecR).

R1: Bit-rate reduced signal output from a bit-rate reduction unit (e.g. 301 of FIG. 3).

Residual: difference between original and upconverted sequences in video data.

Upconverted: a video signal converted from a lower-resolution video signal to a higher-resolution signal format. Typically, an upconverted signal does not carry as high quality visible images as an original video input, if the original video input is in the higher-resolution signal format.

One aspect of an embodiment of the present invention is providing a bit-rate reduction system that can be utilized for a plurality of existing video compression standards with a high bit rate reduction efficiency, while retaining a high image quality. Another aspect of an embodiment of the present invention is separating original video data into a main layer processing and a support layer processing within the bit-rate reduction system, so that main layer data and support layer data can be separately processed for a high bit rate reduction efficiency prior to transmission, while retaining a high visible image quality upon decoding and combination of the separated video data at a receiving device. Some of these two above-aspects of the invention may be further described and/or claimed by related patent applications to this application.

Furthermore, another aspect of an embodiment of the present invention is utilizing a novel combiner processing system and a related method of operation for support layer processing prior to transmission, wherein the novel combiner processing system and the related method of operation contribute to the high bit rate reduction efficiency as well as the retention of high image quality by exhibiting specific novel characteristics, such as detection of repeat patterns, small high frequency details, motion vector detection from full image reconstruction by adding upconverted image into residual information and the original image, and computer-generated information such as texts contained in one or more images, which are enabled in part by a non-linear quantization module and a related method that are not properly utilized in conventional video processing loop systems.

In addition, another aspect of an embodiment of the present invention is providing a bit-rate reduction unit that can detect edges, busyness, and computer-generated information such as texts for selective reduction and processing of large edges, high busyness area, and/or other characteristics in video data, which accommodates reduced bit-rate transmission of the video data without any or substantial visible degradation of image and video quality.

FIG. 1 shows a pre-processor system block diagram (100) for a bit-rate reduction system architecture with a main layer and a support layer prior to transmission of the video data to a receiving device, in accordance with an embodiment of the invention. As shown in FIG. 1, the pre-processor system block comprises a decimator (107), a main compressor (109), a decompressor (105), an upconverter (103), and a combiner processing system (101).

In a preferred embodiment of the invention, the decimator (107) receives original video input ($V_{Original}$), and processes the original video input to filter and/or reduce a high-frequency portion of the original video input. In one embodiment, the decimator (107) includes a horizontal low-pass filter and a vertical low-pass filter that filter out and/or reduce the high-frequency portion of the original video input for bit-rate reduction in the main layer processing pathway. Furthermore, the decimator (107) may also include a horizontal pixel count reduction unit and a vertical pixel count reduction unit, which reduce horizontal and/or vertical domain pixel counts, for example, by eliminating 1 pixel out of 2 pixels that are horizontally or vertically aligned in sequence. In the preferred embodiment of the invention, the decimator (107) can be configured to reduce horizontal and vertical pixel counts in the video signals.

Furthermore, as shown in FIG. 1, the main compressor (109) generates bit-rate reduced and compressed main layer output signals. The main compressor (109) also generates motion vector input signals (Umv) and mode input signals (Umode), which are fed into the combiner processing system (101) for support layer processing. Moreover, the main compressor (109) also outputs compressed video signals to the decompressor (105), which in turn reconstructs and decompresses the compressed video signals, and sends the reconstructed and decompressed video signals to the upconverter (103). Then, the upconverter upconverts the reconstructed and decompressed video signals, and generates upconverted and reconstructed video input signals (UBL) to the combiner processing system (101) for support layer processing. The upconverted and reconstructed video input signals (UBL) generally does not contain all of the original video input information, but comparing the differences between the original video input signals ($V_{Original}$) and the upconverted and reconstructed video input signals (UBL) are useful in calculating and deriving residual signals, which can be utilized for additional bit-rate reduction for the support layer processing in the combiner processing system (101). As shown in FIG. 1, the combiner processing system (101) generates bit-rate reduced data for the support layer output. Various embodiments of the combiner processing system (101) are further explained in other figures.

Figure 2:
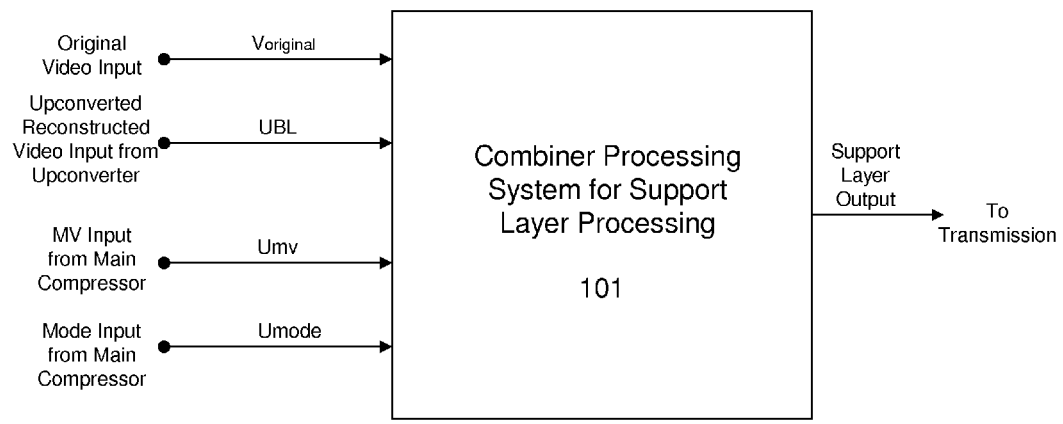
FIG. 2 shows a macro block view of a combiner processing system for support layer processing, in accordance with an embodiment of the invention.

FIG. 2 shows a macro block view (200) of a combiner processing system block (101) for support layer processing, in accordance with an embodiment of the invention. In this embodiment of the invention, the combiner processing system block (101) takes an original video input ($V_{Original}$), a video input (UBL) from the upconverter, a motion vector (MV) input (Umv) from a main compressor, and a mode input (Umode) from the main compressor. Then, the combiner processing system block (101) generates output bitstream signals for the support layer, wherein the output bitstream signals represent the result of additional bit rate reduction for cutting large edges and overly-busy areas, motion vector detection and compensation based on residual signals with addition of upconverted image signals, and a non-linear quantization that retains both computer-generated information such as texts and small high frequency details. Furthermore, the output bitstream signals from the combiner processing system block (101) also serve as a separated pathway for carrying computer-generated information such as texts through the support layer. As shown in FIG. 2, the output bitstream signals from the combiner processing system block (101) can be sent to a support layer decoder or a support layer decoding stage after transmission, in one or more embodiments of the invention.

Figure 3:
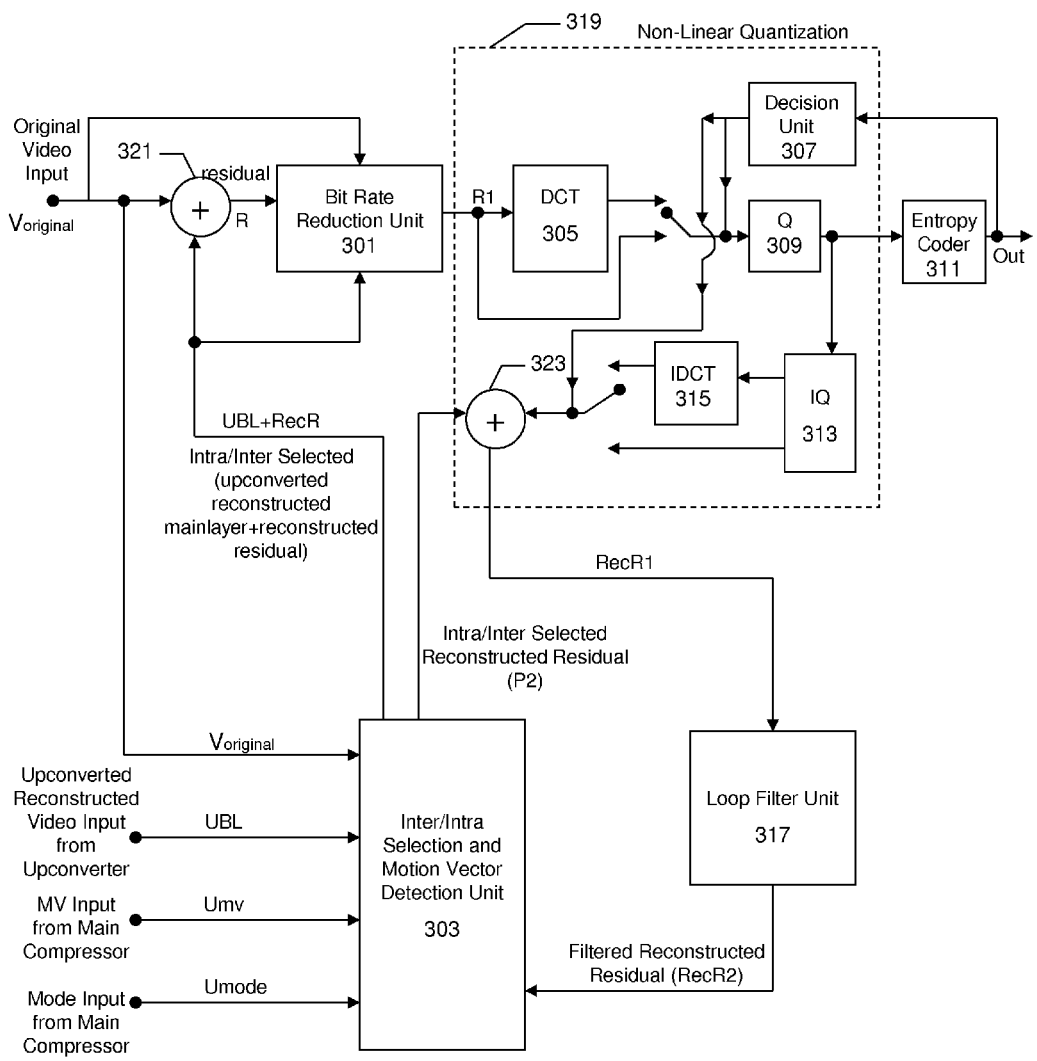
FIG. 3 shows a combiner processing system for support layer processing in accordance with an embodiment of the invention.

FIG. 3 shows a combiner processing system (101) for support layer processing in accordance with an embodiment of the invention. In a preferred embodiment of the invention, the combiner processing system (101) comprises a bit-rate reduction unit (301), an inter/intra selection and motion vector detection unit (303), a non-linear quantization module (319), a loop filter unit (317), a first adder (321) for generating a residual signal as an input to the bit-rate reduction unit (301), and a second adder (323) for generating a reconstructed residual signal (RecR1) as an input to the loop filter unit (317).

In the preferred embodiment of the invention, the combiner processing system (101) takes an original video input ($V_{Original}$), a video input called "UBL" containing upconverted and reconstructed main layer information from an upconverter, a motion vector (MV) input called "Umv" originating from a main compressor which contains upconverted mode selection and upconverted MV from the main layer from a main compressor, and a mode input called "Umode" from the main compressor. As shown in FIG. 3, these inputs (e.g. $V_{Original}$, UBL, Umv, and Umode) are inputted into the inter/intra selection and motion vector detection unit (303) inside the combiner processing system (101) for support layer processing. The inter/intra selection and motion vector detection unit (303) is configured to make an appropriate mode selection decision between an inter mode and an intra mode. The inter/intra selection and motion vector detection unit (303) is also configured to provide motion vector (MV) detection by uniquely adding upconverted reconstructed main layer information to reconstructed residual information, so that the motion vector detection can be based on a full reconstructed image in the support layer processing. Furthermore, the inter/ intra selection and motion vector detection unit (303) is also configured to generate an addition of the upconverted reconstructed main layer signal and the reconstructed residual signal as an output (i.e. UBL+RecR), as well as a reconstructed residual signal (i.e. P2) after the intra/inter mode selection as another output.

Moreover, as shown in FIG. 3, the combiner processing system (101) also provides the first adder (321) for generating the residual signal as one of several inputs to the bit-rate reduction unit (301). The residual signal is the difference between the original and the upconverted sequences in video data. In the preferred embodiment of the invention, the first adder (321) takes the original video input ($V_{Original}$) and the intra/inter selected signal called "UBL+RecR," which is a combination of upconverted reconstructed main layer information from the upconverter and the reconstructed residual information. The first adder (321) adds the original video input ($V_{Original}$) and the intra/inter selected signal (UBL+RecR) to generate a residual signal called "R," which is fed into the bit-rate reduction unit (301).

Continuing with FIG. 3, the bit-rate reduction unit (301) is capable of detecting edges, busyness, and computer-generated information such as texts for selective reduction and processing of large edges, high busyness area, and/or other characteristics in video data to accommodate reduced bit-rate transmission of the video data without any or substantial visible degradation of image and video quality. In the preferred embodiment of the invention, the bit-rate reduction unit (301) takes original image signal information, residual signal information, and up-converted image signal information, and generates a bit-rate reduced signal, called "R1," as shown in FIG. 3, which can be further processed by the non-linear quantization module (319), the loop filter unit (317), and any other relevant loop system components in the combiner processing system (101) for support layer processing. In one embodiment of the invention, the loop filter unit (317) may incorporate or be utilized in conjunction with a mosquito noise reducer unit and a deblocking unit (make a global change). In another embodiment of the invention, the loop filter unit (317) may not include or be utilized with the mosquito noise reducer unit and the deblocking unit (make a global change)

The combiner processing system (101) also incorporates the non-linear quantization module (319), as shown in FIG. 3. In the preferred embodiment of the invention, the non-linear quantization module (319) comprises a quantization logic block that includes a decision unit (307), a discrete cosine transform (DCT) block (305), a quantization (Q) unit (309), an inverse quantization (IQ) unit (313), and an inverse discrete cosine transform (IDCT) unit (315), wherein the decision unit (307) provides the lowest bit-rate pathway between a DCT (305)→Q (309)→IQ (313)→IDCT (315) pathway and a Q (309)→IQ (313) pathway by selectively connecting and switching between the two pathways. The second pathway (i.e. Q (309)→IQ (313) is to bypass the first pathway (i.e. DCT (305)→Q (309)→IQ (313)→IDCT (315)). The decision unit (307) generally selects one of the two pathways that provides a lower bit rate than the other pathway for the non-linear quantization module (319).

Moreover, in the preferred embodiment of the invention, the output from the non-linear quantization module (319) is fed into an entropy coder (311), which generates the resulting bit-rate reduced signals from the combiner processing system for the support layer. The resulting bit-rate reduced signals for the support layer (i.e. outputs from the entropy coder (311)) can be subsequently combined with the main layer signals for transmission to a video-signal receiving device that can decode both the main layer signals and the support layer signals for reproduction of video data.

Furthermore, in the preferred embodiment of the invention, the second adder (323) in the non-linear quantization module (319) can add outputs of the intra/inter selected reconstructed residual (P2) signal and an output from either the IDCT unit (315) or the IQ unit (313) for generating a reconstructed residual signal, called "RecR1," as an input to the loop filter unit (317). The loop filter unit (317) provides signal filtering in the loop system for reconstructed residual signals. In FIG. 3, the filtered reconstructed residual signals are represented by the label "RecR2," while the reconstructed residual signals prior to filtering are represented by the label "RecR1." In another embodiment of the invention, the non-linear quantization module may comprise different component configurations and connections to provide the non-linear quantization to the combiner processing system (101) for support layer processing.

Unlike conventional Laplacian pyramid video encoding schemes, other conventional scalable video encoding schemes, and conventional loop systems for video data processing, incorporation of the non-linear quantization module (319) for support layer processing in accordance with various embodiments of the present invention provide uniquely novel advantages. For example, the non-linear quantization module (319) enable retention of both sharp image transitions, such as texts or other computer-generated information, and small-signal level high frequency details, such as human faces, during the support layer processing by the combiner processing system (101).

Furthermore, unlike conventional Laplacian pyramid video encoding schemes and other conventional scalable video encoding schemes, which fail to provide meaningful bit-rate reduction during video processing, various embodiments of the present invention provide efficient bit-rate reductions while retaining high-quality of the video data by incorporating a full image reconstruction for motion vector detection that uniquely adds upconverted image into residual information for a full image reconstruction. Moreover, unlike conventional video coding methods, the bit-rate reduction unit (301) in the combiner processing system (101) accommodates a separate pathway for computer-generated information such as texts to detect textual or other computer-generated information, while also providing large edge detections and busyness detections for selective reduction and processing of large edges, high busyness areas, and/or other characteristics in video data to accommodate reduced bit-rate transmission of the video data without any or substantial visible degradation of image and video quality.

Figure 4:
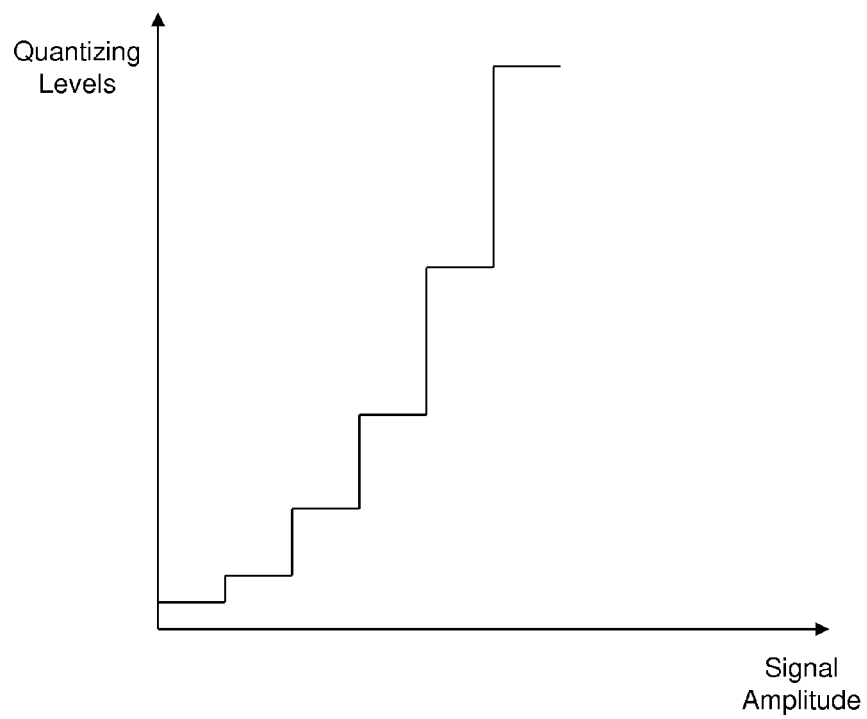
FIG. 4 shows a signal amplitude vs. quantization levels in a non-linear quantization model, in accordance with an embodiment of the invention.

FIG. 4 shows a signal amplitude vs. quantization levels in a non-linear quantization model (400), in accordance with an embodiment of the invention. The non-linear quantization model (400), when utilized in the support layer processing in the combiner processing system (101), favors small amplitude signals over large amplitude signals, because quantizing levels are lower for small amplitude signals than for large amplitude signals, as shown in FIG. 4. For the support layer processing, which is designed to process small high-frequency details such as facial features as well as computer-generated information such as texts, the unique and novel utilization of the non-linear quantization model (400) helps the combiner processing system (101) achieve the reduced bit-rate transmission of the video data without any or substantial visible degradation of image and video quality.

Figure 5:
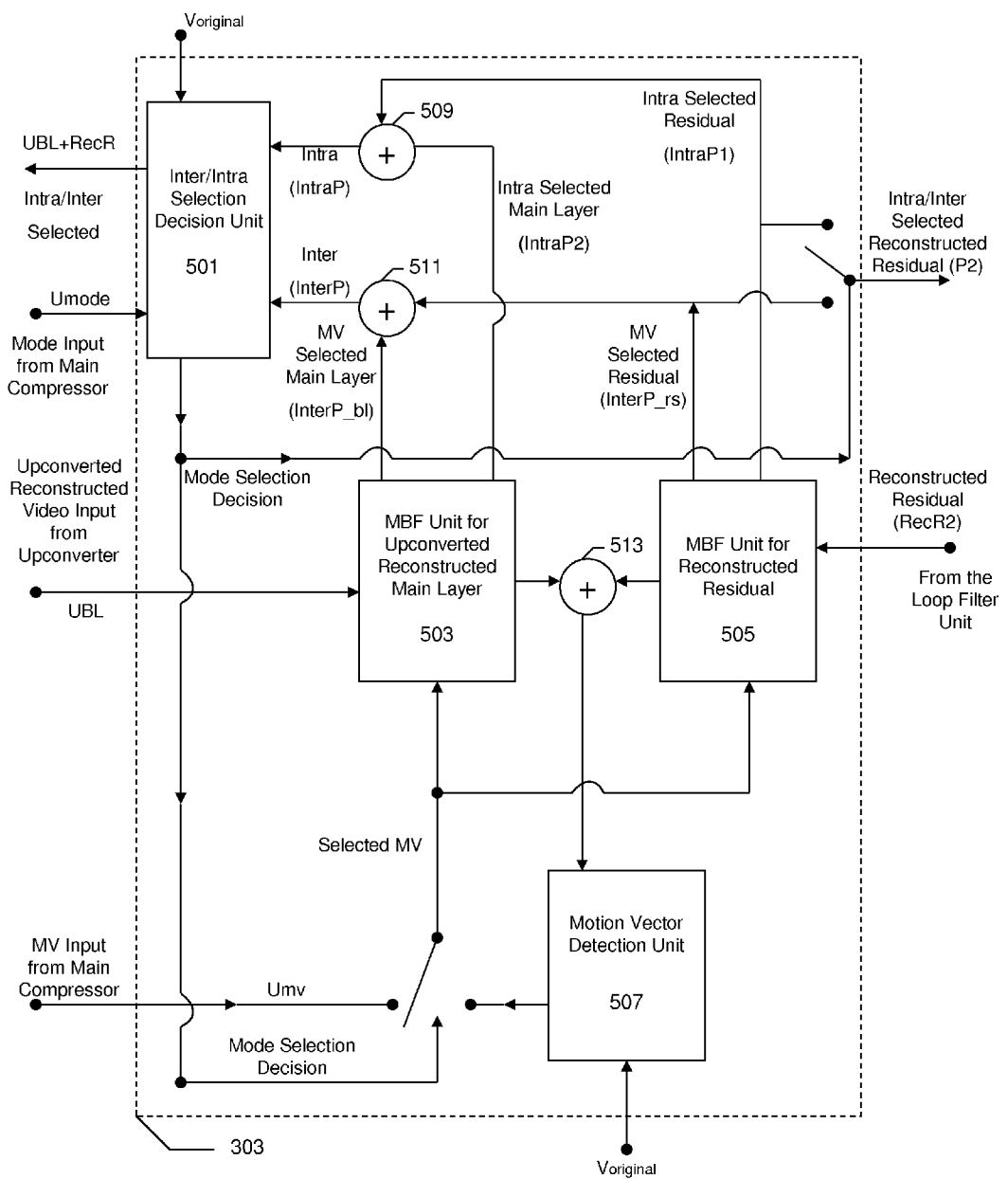
FIG. 5 shows a inter/intra selection and motion vector detection unit in accordance with an embodiment of the invention.

FIG. 5 shows a inter/intra selection and motion vector detection unit (303) in accordance with an embodiment of the invention. In a preferred embodiment of the invention, the inter/intra selection and motion vector detection unit (303) receives an original video input ($V_{Original}$), a video input from an upconverter called "UBL" containing upconverted and reconstructed main layer information, a motion vector (MV) input called "Umv" originating from a main compressor which contains upconverted mode selection and upconverted MV from the main layer, and a mode input called "Umode" from the main compressor. In addition, the inter/intra selection and motion vector detection unit (303) also receives the filtered reconstructed residual signals (i.e. "RecR2") from the loop filter unit (317).

As shown in FIG. 5, the original video input ($V_{Original}$) is sent to an inter/intra selection decision unit (501) and also to a motion vector detection unit (507) in the preferred embodiment of the invention. Furthermore, the mode input (i.e. "Umode") is sent to the inter/intra selection decision unit (501), while the video input from the upconverter (i.e. "UBL") containing the reconstructed and upconverted main layer information is sent to an MBF unit for upconverted reconstructed main layer (503). MBF units are generally memory units, which perform memory read-in and read-out functions for input signals and/or information. In addition, the motion vector input (i.e. Umv) containing the upconverted mode selection and the upconverted MV from the main layer is sent to a switching section that connects to either a motion vector detection unit (507) or the MBF unit for upconverted reconstructed main layer (503). Moreover, the filtered reconstructed residual signals (i.e. "RecR2") from the loop filter unit (317) is sent to an MBF unit for reconstructed residual (505).

In the preferred embodiment of the invention, the inter/intra selection decision unit (501) is configured to make an appropriate mode selection decision between an inter mode and an intra mode, and outputs the mode selection decision to control a switched output (i.e. Intra/Inter selected reconstructed residual, or P2) that selects either the intra selected residual signal (i.e. IntraP1) or the MV selected residual signal (i.e. InterP_rs). The inter/intra selection decision unit (501) can also generate an addition of the upconverted reconstructed main layer signal and the reconstructed residual signal as an output (i.e. UBL+RecR) based on the inter/intra mode selection.

Furthermore, in the preferred embodiment of the invention, the MBF unit for upconverted reconstructed main layer (503) is a memory unit that buffers, temporarily stores, and/or processes the upconverted reconstructed main layer (i.e. UBL) by the selected MV from the MV input from the main compressor (i.e. Umv) or the motion vector detection unit (507). As shown in FIG. 5, in the preferred embodiment of the invention, the MBF unit for upconverted reconstructed main layer (503) temporarily stores and provides an MV selected main layer signal (i.e. InterP_b1) and an intra selected main layer signal (i.e. IntraP2). Moreover, the MBF unit for reconstructed residual (505) temporarily stores and provides an MV selected residual signal (i.e. InterP_rs) and an intra selected residual signal (i.e. IntraP1).

In the preferred embodiment of the invention as shown in FIG. 5, the MV selected main layer signal (i.e. InterP_b1) and the MV selected residual signal (i.e. InterP_rs) are added together in a first adder (511) to form an inter signal (i.e. InterP), which is fed into the inter/intra selection decision unit (501). Furthermore, the intra selected main layer signal (i.e. IntraP2) and the intra selected residual signal (i.e. IntraP1) are added together in a second adder (509) to form an intra signal (i.e. IntraP), which is also fed into the inter/intra selection decision unit (501).

Furthermore, the MBF unit for upconverted reconstructed main layer (503) and the MBF unit for reconstructed residual (505) temporarily store and provide output signals for a third adder (513), which adds the upconverted reconstructed main layer signals to the reconstructed residual signals to send the added signals to the motion vector detection unit (507). As shown in FIG. 5, in the preferred embodiment of the invention, the motion vector detection unit (507) detects motion vectors on the full reconstructed image, which is a result of the addition of the upconverted reconstructed main layer signals to the reconstructed residual signals. In one or more embodiments of the invention, the addition of the upconverted reconstructed main layer information to the reconstructed residual information enables the motion vector detection to be based on a full reconstructed image in the support layer processing, which achieves bit-rate reduction efficiency while also retaining high-quality image signal recovery and reconstruction at signal decoding and combination stages by a receiving device.

Figure 6:
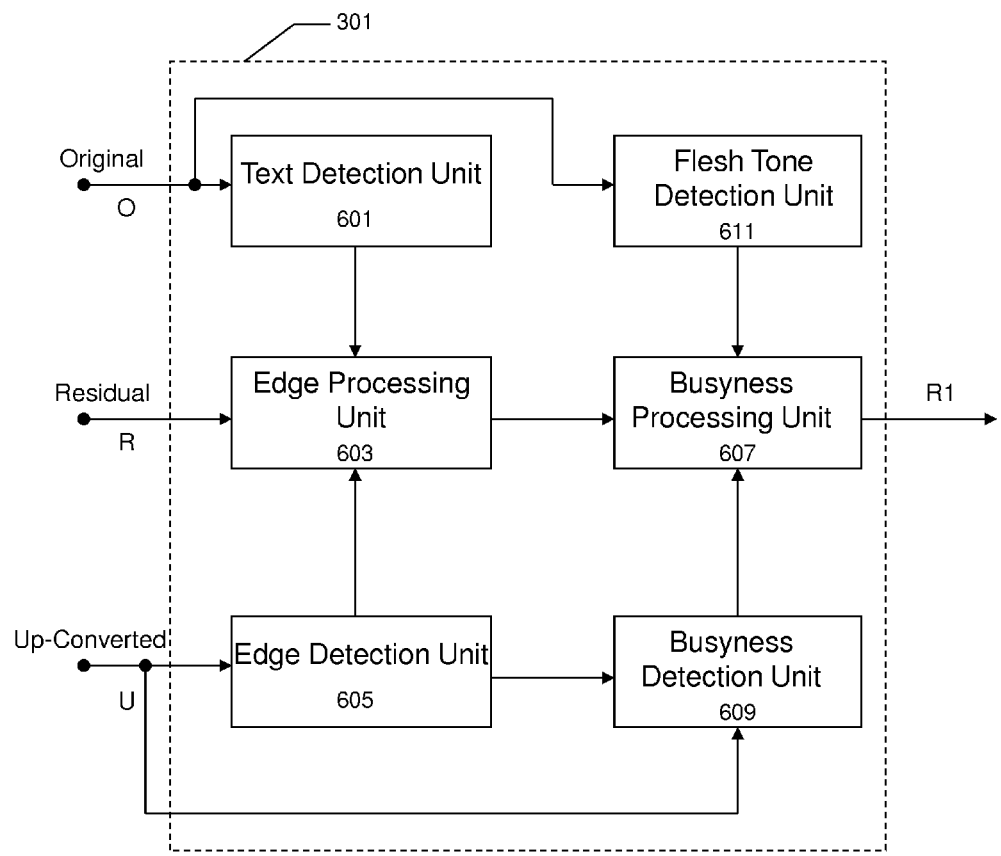
FIG. 6 shows a bit-rate reduction unit, which may be utilized inside a combiner processing system for support layer processing, or in association with a video encoder loop, in accordance with one or more embodiments of the invention.

FIG. 6 shows a bit-rate reduction unit (600), which can be utilized inside the combiner processing system (e.g. 101 of FIG. 3) in a preferred embodiment of the invention as an internal block (301) to reduce bit rates in support layer processing, as previously shown in FIG. 3. In another embodiment of the invention, the bit-rate reduction unit (600) may be utilized with a video encoder loop, regardless of the presence of the combiner processing system (101). The bit-rate reduction unit (600) is a functional unit providing detection of edges, busyness, and computer-generated information such as texts for selective reduction and processing of large edges, high busyness areas, and/or other characteristics in video data to accommodate reduced bit-rate transmission of the video data without any or substantial visible degradation of image and video quality.

In the preferred embodiment of the invention as shown in FIG. 6, the bit-rate reduction unit (600) comprises a text detection unit (601), an edge processing unit (603), an edge detection unit (605), a busyness detection unit (609), a busyness processing unit (607), and a flesh tone detection unit (611). The text detection unit (601) receives video data signals that may be original (e.g. "O," as shown in FIG. 6), transformed, and/or processed, and detects computer-generated information such as texts within the video data signals. In general, textual information in video data are typically computer-generated characters, letters, and/or shapes that are synthesized, merged, and/or superimposed in the remaining portion of the video data. Furthermore, textual information in the video data often tend to exhibit sharp image transitions, or large signal levels. The text detection unit (601) in the bit-rate reduction unit (600) accurately detects these computer-generated information such as texts by detecting sharp image transitions and large-signal level characteristics, and provides a separate information processing pathway for these computer-generated information such as texts in the support layer, in accordance with an embodiment of the present invention.

In addition, in one embodiment of the invention, the bit-rate reduction unit (600) may also include a flesh tone detection unit (611), which takes the original video data signals to detect human skin tone features, facial features, and/or other small high-frequency details in the original video data signals. Then, the flesh tone detection unit (611) controls the busyness processing unit (607) to reduce bit-rates for video data that are not human skin tone features, facial features, and/or other small high-frequency details in the original video data signals. The busyness processing unit (607), in turn, can generate bit-rate reduced output signals (R1). In another embodiment of the invention, the bit-rate reduction unit (600) may not include a separate flesh tone detection unit (611), yet may still be able to detect human skin tone features, facial features, and/or other small high-frequency details in other units inside the bit-rate reduction unit (600).

Furthermore, the edge detection unit (605) receives upconverted video data signals (i.e. "U," as shown in FIG. 6), while the edge processing unit (603) receives residual signals (i.e. "R," as shown in FIG. 6), which represent the differences between the original video data signals and the upconverted video data signals. In one embodiment of the invention, the edge detection unit (605) can search, identify, and/or count a number of edges in video data, in order to determine a need to reduce and/or process an edge or not, based on the upconverted video data signals. If a particular edge is large, and is determined by the edge detection unit (605) for reduction and/or other bit-reduction processing, the edge processing unit (603) reduces and/or processes the large edge for bit-rate reduction based on information contained in the residual signals.

Continuing with FIG. 6, the bit-rate reduction unit (600) also contains the busyness detection unit (609) and the busyness processing unit (607). The term "busyness," in context of various embodiments of the present invention, refers to having many detailed and fine textures in a process area that includes a current pixel being analyzed and adjacent pixels near the current pixel. In general, the process area is a portion of still or moving image data for determining a need to reduce and/or process overly-busy area or not for bit-rate reduction. The busyness detection unit (609) can detect overly-busy areas based on the upconverted video data signals and edge detection information. If the process area is determined to be overly busy, then the busyness detection unit (609) instructs the busyness processing unit (607) to reduce and/or process the overly-busy area for bit-rate reduction. Preferably, the busyness detection unit (609) determines whether the process area is a "non-busy" area or an overly-busy area, based a "busyness" measure relative to empirically-defined threshold values. Moreover, the busyness processing unit (607) generates a bit-rate reduced signal, shown as "R1" in FIG. 6, as an output from the bit-rate reduction unit (600). In one example, the bit-rate reduced signal (i.e. R1) is a resulting residual signal after reduction and/or other bit-reduction processing of large edges and overly-busy areas in the video data.

Subsequently, in the preferred embodiment of the invention, the bit-rate reduced signal (i.e. R1) can go through a non-linear quantization module (e.g. 319 of FIG. 3) and a motion compensation loop, if the bit-rate reduction unit (600) is part of a combiner processing system (e.g. 101 of FIG. 3) for support layer processing. In another embodiment of the invention, the bit-rate reduced signal (i.e. R1) from the bit-rate reduction unit (600) may be utilized by another video processing block, such as a video encoder loop.

In one embodiment of the invention, the bit-rate reduction unit (600) may be implemented by a software program executed on a programmable device and/or another hardware device, such as a graphics processor unit (GPU), a field programmable gate array (FPGA), a central processing unit (CPU), and a memory unit of a computing device or another electronic device. In another embodiment of the invention, the bit-rate reduction unit (600) may be at least partially hardwired and/or embedded codes operating in an application-specific integrated circuit (ASIC), or another semiconductor chip that loads the hardwired and/or embedded codes. ASIC's or other semiconductor chips that hardwire and/or embed the functionality of the bit-rate reduction unit may be utilized for televisions and other electronic devices.

Various embodiments of the invention of have been described above and also illustrated in part by FIGS. 1-6. The present invention provides several advantages over conventional Laplacian pyramid video encoding schemes, other conventional scalable video encoding schemes, and conventional loop systems for video data processing. For example, one advantage is that the present invention in accordance with one or more embodiments of the invention provides a bit-rate reduction system that can be utilized for a plurality of existing video compression standards with a high bit rate reduction efficiency, while retaining a high image quality. By incorporating a non-linear quantization module (e.g. 319 of FIG. 3) for support layer processing, the combiner processing system for support layer processing in one or more embodiments of the present invention can retain both sharp image transitions, such as textual information, and small-signal level high frequency details, such as human faces, during the support layer processing by the combiner processing system.

Furthermore, unlike conventional Laplacian pyramid video encoding schemes and other conventional scalable video encoding schemes, which fail to provide meaningful bit-rate reduction during video processing, various embodiments of the present invention provide efficient bit-rate reductions while retaining high-quality of the video data by incorporating a full image reconstruction for motion vector detection that uniquely adds upconverted image into residual information for a full image reconstruction. Moreover, unlike conventional video coding methods, the bit-rate reduction unit that can be utilized inside or outside of the combiner processing system accommodates a separate pathway for computer-generated information such as texts to detect textual or other computer-generated information, while also providing large edge detections and busyness detections for selective reduction and/or other bit-reduction processing of large edges, high busyness areas, and/or other characteristics in video data to accommodate reduced bit-rate transmission of the video data without any or substantial visible degradation of image and video quality.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A combiner processing system for support layer processing of video data, the combiner processing system comprising:
   a bit-rate reduction unit that receives an original video input (VOriginal), a video input signal for unconverted and reconstructed main layer (UBL), a motion vector input signal of a main layer from a main compressor (Umv), and a mode input from the main compressor (Umode) as inputs, wherein the bit-rate reduction unit detects textual information, edges, and busyness in one or more images in the video data on the input signals, and selectively reduces or processes large edges and overly-busy busyness areas in the video data to generate a bit-rate reduced signal output, wherein the bit-rate reduction unit is executed on a memory unit and at least one of a programmable device and another hardware device;
   a non-linear quantization module that selectively outputs non-linearly quantized and bit-rate reduced signals, wherein the non-linearly quantized and bit-rate reduced signals retain textual and other large-signal level information as well as small high-frequency details and small-signal level information present in an original version of the video data;

an inter or intra selection and motion vector detection unit that makes a decision for inter or intra mode selection and detects motion vectors based on full image information reconstructed from an addition of upconverted image signals to residual signals; and a loop filter unit that provides a filtered reconstructed residual signal to the inter or intra selection and motion vector detection unit.

2. The combiner processing system of claim 1, further comprising a first signal adder for generating a residual signal (R) as an input to the bit-rate reduction unit, wherein the first signal adder determines a difference between the original video input (VOriginal) and the upconverted and reconstructed main layer signal (UBL) and a reconstructed residual signal (RecR) to generate the residual signal (R).

3. The combiner processing system of claim 1, further comprising a second signal adder for generating a reconstructed residual signal (RecR1) as an input to the loop filter unit, wherein the second signal adder takes an intra or inter-selected reconstructed residual signal (P2) and a switched output from an inverse discrete cosine transform (IDCT) unit or an inverse quantization (IQ) unit.

4. The combiner processing system of claim 1, wherein the non-linear quantization module comprises a discrete cosine transform unit, a quantization unit, an entropy coder, an inverse quantization unit, an inverse discrete cosine transform unit, and a decision unit.

5. The combiner processing system of claim 1, wherein the loop filter unit includes at least one of a mosquito noise reduction unit and a deblocking unit.

6. The combiner processing system of claim 1, wherein the inter or intra selection and motion vector detection unit includes an inter or intra selection decision unit that generates a mode selection decision signal for an output switch that chooses an output between an intra-selected residual signal (IntraP1) and a motion vector-selected residual signal (InterP_rs).

7. The combiner processing system of claim 1, wherein the inter or intra selection and motion vector detection unit includes a motion vector detection unit that receives the addition of the upconverted image signals and the residual signals to reconstruct the full image information for detection of incoming motion vectors.

8. The combiner processing system of claim 1, wherein the bit-rate reduction unit includes a text detection unit, an edge detection unit, an edge processing unit, a flesh tone detection unit, a busyness detection unit, and a busyness processing unit for detections of the textual information, the edges, the busyness, and flesh tones in the one or more images in the video data, and for selective reduction or other bit-reduction processing of the large edges and the overly-busy busyness areas in the video data to generate the bit-rate reduced signal output.

9. The combiner processing system of claim 1, wherein the non-linear quantization module, the inter or intra selection and motion vector detection unit, and the loop filter unit are executed on the memory unit and at least one of the programmable device and another hardware device.

10. The combiner processing system of claim 1, wherein at least one of the programmable device and another hardware device is a graphics processor unit (GPU), a field programmable gate array (FPGA), a central processing unit (CPU), an application-specific integrated circuit (ASIC), or another hardware device.

11. A method for operating a combiner processing system for support layer processing, the method comprising:

receiving an original video input (VOriginal), a video input signal for upconverted and reconstructed main layer (UBL), a motion vector input signal of a main layer from a main compressor (Umv), and a mode input from the main compressor (Umode) as input signals to the combiner processing system;

detecting textual information, edges, flesh tones, and busyness in one or more images in video data based on the input signals in a bit-rate reduction unit executed on a memory unit and at least one of the programmable device and another hardware device;

selectively reducing or processing large edges and overly-busy busyness areas in the video data to generate a bit-rate reduced signal output from the bit-rate reduction unit;

selectively outputting non-linearly quantized and bit-rate reduced signals from a non-linear quantization module executed on the memory unit and at least one of the programmable device and another hardware device, wherein the non-linearly quantized and bit-rate reduced signals retain textual and other large-signal level information as well as small high-frequency details and small-signal level information present in an original version of the video data;

determining an inter mode or intra mode selection and detecting motion vectors based on full image information reconstructed from an addition of upconverted image signals to residual signals in an inter or intra selection and motion vector detection unit, wherein the inter or intra selection and motion vector detection unit is executed on the memory unit and at least one of the programmable device and another hardware device; and filtering a reconstructed residual signal from the non-linear quantization module in a loop filter unit to generate a filtered reconstructed residual signal to the inter or intra selection and motion vector detection unit, wherein the loop filter unit is executed on the memory unit and at least one of the programmable device and another hardware device.

12. The method of claim 11, wherein the non-linear quantization module comprises a discrete cosine transform unit, a quantization unit, an entropy coder, an inverse quantization unit, an inverse discrete cosine transform unit, and a decision unit.

13. The method of claim 11, wherein the loop filter unit includes at least one of a mosquito noise reduction unit and a deblocking unit.

14. The method of claim 11, wherein the inter or intra selection and motion vector detection unit includes an inter or intra selection decision unit that generates a mode selection decision signal for an output switch that chooses an output between an intra-selected residual signal (IntraP1) and a motion vector-selected residual signal (InterP_rs).

15. The method of claim 11, wherein the inter or intra selection and motion vector detection unit includes a motion vector detection unit that receives the addition of the upconverted image signals and the residual signals to reconstruct the full image information for detection of incoming motion vectors.

16. The method of claim 11, wherein the bit-rate reduction unit includes a text detection unit, an edge detection unit, an edge processing unit, a flesh tone detection unit, a busyness detection unit, and a busyness processing unit for detections of the textual information, the edges, the busyness, and flesh tones in the one or more images in the video data, and for selective reduction or other bit-reduction processing of the large edges and the overly-busy busyness areas in the video data to generate the bit-rate reduced signal output.

17. The method of claim 11, wherein at least one of the programmable device and another hardware device is a graphics processor unit (GPU), a field programmable gate array (FPGA), a central processing unit (CPU), an application-specific integrated circuit (ASIC), or another hardware device.

* * * * *